(12) United States Patent  
Choukroun et al.

(10) Patent No.: US 10,042,188 B2  
(45) Date of Patent: Aug. 7, 2018

(54) PROCESS AND METHOD FOR REAL-TIME PHYSICALLY ACCURATE AND REALISTIC-LOOKING GLASSES TRY-ON

(71) Applicant: FITTINGBOX, Labege (FR)

(72) Inventors: Ariel Choukroun, Toulouse (FR); Jerome Guenard, Chevannes (FR); Sylvain Le Gallou, Saint Orens de Gameville (FR); Christophe Dehais, Toulouse (FR)

(73) Assignee: FITTINGBOX, Labege (FR)

( * ) Notice: Subject to any disclaimer, the term of this patent is extended or adjusted under 35 U.S.C. 154(b) by 26 days.

(21) Appl. No.: 15/051,325

(22) Filed: Feb. 23, 2016

(65) Prior Publication Data

US 2016/0246078 A1     Aug. 25, 2016

(30) Foreign Application Priority Data

Feb. 23, 2015   (FR) ...................... 15 51531

(51) Int. Cl.
  *G02C 13/00*   (2006.01)
  *G06T 19/00*   (2011.01)
  (Continued)

(52) U.S. Cl.
  CPC ....... *G02C 13/003* (2013.01); *G06K 9/00315* (2013.01); *G06K 9/00335* (2013.01);
  (Continued)

(58) Field of Classification Search
  CPC ............ G02C 13/003; G06T 7/13; G06T 7/70
  (Continued)

(56) References Cited

U.S. PATENT DOCUMENTS

| 5,421,589 A | * | 6/1995 | Monroe | A63F 13/08 |
| | | | | 345/9 |
| 8,165,347 B2 | * | 4/2012 | Heinzmann | G06K 9/00281 |
| | | | | 382/100 |

(Continued)

FOREIGN PATENT DOCUMENTS

| EP | 2 678 804 A1 | 1/2014 |
| FR | 2955409 B1 | 7/2015 |

OTHER PUBLICATIONS

Sami Romdhani, "Face Image Analysis using a Multiple Features Fitting Strategy," Ph.D. Thesis, University of Basel, 2005, Basel, Switzerland.

(Continued)

*Primary Examiner* — Barry Drennan
*Assistant Examiner* — Terrell Robinson
(74) *Attorney, Agent, or Firm* — Im IP Law; C. Andrew Im (57) ABSTRACT

A method for generating a real-time realistic-looking image of a pair of virtual glasses positioned on a real user face image issued from a single image, a bundle of pictures, a video clip or a real-time camera streams. A face analysis element estimates the 3D rotation matrix, the 3D translation vector, morphology parameters of the user's face. A glasses positioning element associated with a try-on mode for look or real-size simulation estimates the 3D rotation matrix, the 3D translation vector, global and local deformation parameters of the virtual glasses, and arms articulation, adapted to the morphology parameters computed by the face analysis element. A realistic rendering element mixes the real user face image with the virtual glasses positioned by the glasses positioning element.

32 Claims, 2 Drawing Sheets

(51) Int. Cl.
*G06T 3/60* (2006.01)
*G06K 9/00* (2006.01)
*G06T 5/00* (2006.01)
*G06K 9/52* (2006.01)
*G06T 7/60* (2017.01)
*G06T 7/20* (2017.01)
*G06K 9/46* (2006.01)
*G06T 7/70* (2017.01)
*G06T 7/13* (2017.01)

(52) U.S. Cl.
CPC ............ *G06K 9/4604* (2013.01); *G06K 9/52* (2013.01); *G06T 3/60* (2013.01); *G06T 5/00* (2013.01); *G06T 7/13* (2017.01); *G06T 7/20* (2013.01); *G06T 7/60* (2013.01); *G06T 7/70* (2017.01); *G06T 19/006* (2013.01); *G06T 2207/20112* (2013.01); *G06T 2207/30201* (2013.01)

(58) Field of Classification Search
USPC ......................................... 345/632
See application file for complete search history.

(56) References Cited

U.S. PATENT DOCUMENTS

| | | | |
|---|---|---|---|
| 8,733,936 B1* | 5/2014 | Kornilov ............... | A61B 3/10 351/159.75 |
| 8,737,764 B2* | 5/2014 | Kokemohr ............ | G06T 5/009 358/3.26 |
| 9,262,695 B2 | 2/2016 | Choukroun et al. | |
| 2002/0105530 A1* | 8/2002 | Waupotitsch ......... | G06T 19/00 345/630 |
| 2003/0076990 A1* | 4/2003 | Brand ................... | G06T 17/10 382/154 |
| 2008/0309664 A1* | 12/2008 | Zhou .................... | G06T 13/40 345/420 |
| 2011/0292034 A1* | 12/2011 | Corazza ................ | G06T 13/40 345/419 |
| 2012/0313955 A1 | 12/2012 | Choukroun | |
| 2013/0088490 A1* | 4/2013 | Rasmussen ........... | G06T 17/00 345/421 |
| 2014/0055570 A1 | 2/2014 | Dehais et al. | |
| 2014/0104568 A1* | 4/2014 | Cuta ..................... | G02C 7/027 351/204 |
| 2014/0139522 A1* | 5/2014 | Hwang ................. | G06T 13/40 345/419 |
| 2016/0035133 A1 | 2/2016 | Ye et al. | |

OTHER PUBLICATIONS

Blanz et al., "Face Recognition Based on Fitting a 3D Morphable Model," IEEE Trans. Pattern Analysis and Machine Intelligence, Sep. 8, 2003, pp. 1063-1074, vol. 25, No. 9, IEEE.
Reinhard Knothe, "A Global-to-Local Model for the Representation of Human Faces," Ph.D. Thesis, University of Basel, 2009, Basel, Switzerland.
Luca Vacchetti et al., "Combining edge and texture information for real-time accurate 3D camera tracking," Third IEEE and ACM International Symposium on Mixed and Augmented Reality, ISMAR 2004, Nov. 5, 2004, pp. 48-57, IEEE.
M. Dimitrijevic et al., "Accurate Face Models from Uncalibrated and Ill-Lit Video Sequences," Proc. 2004 IEEE computer Society Conference on Computer Vision and Pattern Recognition, CVPR 2004, Jun. 27-Jul. 2, 2004, pp. 1034-1041, IEEE.
Pascal Paysan et al., "A 3D Face Model for Pose and Illumination Invariant Face Recognition," Proc. 2009 Sixth IEEE International Conf. Advanced Video and Signal Based Surveillance, AVSS '09, Sep. 2-4, 2009, pp. 296-301, IEEE Computer Society.
Luca Vacchetti et al., "Stable Real-Time 3D Tracking using Online and Offline Information," IEEE Trans. Pattern Analysis and Machine Intelligence, Oct. 2004, pp. 1385-1391, vol. 26, No. 10, IEEE Computer Society.
J. P. Lewis, "Fast Normalized Cross-Correlation," Vision Interface, May 15, 1995, pp. 120-123, vol. 10, No. 1.
Zhang et al., "Real Time Feature Based 3-D Deformable Face Tracking," Proc. 10th European Conf. Computer Vision: Part II, EECV '08, Oct. 12-18, 2008, pp. 720-732, Springer-Verlag.
Haber et al., "Relighting objects from image collections," IEEE Conf. Computer Vision and Pattern Recognition, CVPR 2009, Jun. 20-25, 2009, pp. 627-634.
R. Basri, "Photometric Stereo with General, Unknown Lighting," Int. J. Computer Vision, May 2007, pp. 239-257, vol. 72, No. 3.
B. Yang, "Variance Soft Shadow Mapping," Proc. 2010 ACM SIGGRAPH Symposium on Interactive 3D Graphics and Games I3D '10, 2010, vo. 29, No. 7.
Randima Fernando, "Percentage-Closer Soft Shadows," Proc. SIGGRAPH '05 ACM SIGGRAPH 2005 Sketches, Jul. 31-Aug. 4, 2005, No. 35, ACM.

* cited by examiner

PROCESS AND METHOD FOR REAL-TIME PHYSICALLY ACCURATE AND REALISTIC-LOOKING GLASSES TRY-ON

RELATED APPLICATIONS

This application claims priority from French Patent Application No. FR 15 51531 filed Feb. 23, 2015, which is herein incorporated by reference in its entirety.

FIELD OF THE INVENTION

This invention relates to the field of image processing and image synthesis. It relates more specifically to the real-time integration of a virtual object into photographs or videos.

PRIOR ART

This invention is an improvement of other inventions from the same applicant.

The context of the invention is that of real time virtual fitting of an object as realistic as possible, these objects being typically but not limited to glasses to be integrated in a photography or a video representing the face of a person substantially in front of the camera.

The growth of internet sales, a limited stock or any other reason that prevents or impedes the real fitting of a real object produces the need for the virtual fitting of this object. The current solutions based on virtual or augmented reality are not sufficient in case of glasses since they lack realism or interactivity. Moreover, they mostly require many data and much time for calculation.

The patent application FR 1050305 of the same applicant, filed on Jan. 18, 2010, is already known in this field.

SUMMARY OF THE INVENTION

The invention first aims at a method for creating a final real-time realistic-looking image of a virtual glasses on a real user face image issued from a single image, bundle of pictures, video clips or real-time camera streams, characterized in that it comprises the following steps:

100. A face analysis process to estimate the 3D rotation matrix, the 3D translation vector, morphology parameters of the user's face;

200. A glasses positioning process associated with a try-on mode for look or real-size simulation that estimate the 3D rotation matrix, the 3D translation vector, and global and local deformation parameters of the virtual glasses, and arms articulation, adapted to the morphology parameters computed in step 100;

400. A realistic rendering process to mix the real user face image with the virtual glasses positioned in step 200.

In various embodiments, that may be used in conjunction whenever technically feasible:

step 100 also comprises estimation of expression parameters of the user's face.

step 100 also comprises estimation of intrinsic camera parameters.

step 200 also comprises a glasses 3D model analysis process that gives parameterization, segmentation into parts and mesh correction.

step 200 comprises two glasses positioning processes associated with try-on modes for look or real-size simulation that estimate the 3D rotation matrix, the 3D translation vector, and global and local deformation parameters of the virtual glasses, and arms articulation, adapted to the morphology parameters computed in step 100.

The method further comprises a step 300 of 3D face tracking algorithm that gives the position and rotation and allow face parameters refinement from multiple images in real-time.

step 400 comprises an estimation of opacity correction and tone mapping parameters.

The method comprises:
a parallel processing pipeline that decorrelates image acquisition, scene analysis process, and rendering;
a fast 3D face pose recovery process;
a head movement model and control filter that always provides, at each frame, a smooth 3D pose to the rendering process.

in the real-time face analysis process of step 100, parameters (3D rotation matrix R, 3D translation vector T, morphology parameters $\alpha$, and expressions parameters $\beta$ of a user face) are estimated using face user model and image contours and 3D semantic points in correspondence with detected features. In this case, more particularly, more than one image may be integrated in the equation.

In particular embodiments, the glasses positioning process (step 200) comprises:

a. an offline processing step for creating a symmetrized and segmented glasses object (arms/frame) from a 3D model that has an accurate parametrization and for repositioning glasses in a reference system.

b. an online real-time processing step that estimates the glasses positioning parameters without interpenetration (3D rotation matrix R, 3D translation vector T, arm opening angle and deformation parameters D) by mixing constraints linked to the object properties and mechanical constraints between the two volumes.

In more particular embodiments, in this case:
the offline processing step takes advantage of the symmetric nature of the object and creates a reference system to correct the 3D geometry, segments the object and creates a fine reference frame. This off-line processing step comprises:
an automatic segmentation step;
a computation of reference frame and non-linear deformation field that maximize the global symmetry given a symmetrization of the object skeleton;
a skeleton extraction method obtained by slicing the object and linking barycenters;
a computation of the displacement of the object vertices given an influence function of the displacement field of the skeleton.

the on-line processing step uses a method of glasses fit to face: where scale is not respected between glasses and all frames are positioned on the face with an opening of the arms of 5 degrees to account for the widening at the face temples. In this mode, the glasses are always fit to the user's face.

the on-line processing step uses a method of glasses fit to face with relative size: where the face size is not known, but glasses are positioned and scaled such that for the average size of the chosen face category, glasses are positioned and arms opening are computed with glasses deformation such that the relative size of the glasses is respected. The try-on is statistically very close to the absolute size.

the on-line processing step uses a method of glasses fit to face with absolute size: where the real face size is known and glasses are positioned in the best possible way on the face, with the guaranty to always get a realistic result.

In particular embodiments of the invention, step 400 comprises a compositing method allowing the real-time integration of a high-dynamic range synthetic scene into a low-dynamic range photograph or video, the compositing method being characterized in that it modifies the computed opacity value α into a corrected value $\alpha_{LDR}$ of objects using the formula:

$$\alpha_{LDR} = \frac{L_{HDR}}{L_{HDR}^{Max}} + \left(1 - \frac{L_{HDR}}{L_{HDR}^{Max}}\right)\alpha = \alpha + (1-\alpha)\frac{L_{HDR}}{L_{HDR}^{Max}}$$

where $L_{HDR}$ is the computed irradiance and $L_{HDR}^{Max}$ is an upper bound on the real scene irradiance.

BRIEF DESCRIPTION OF THE FIGURES

The characteristics and advantages of the invention shall be better understood by reference to the following description that sets out the characteristics of the invention by means of a non-restrictive application example.

The description is based on the attached figures that represent.

DETAILED DESCRIPTION OF EXAMPLES OF IMPLEMENTATION OF THE INVENTION

Figure 1:
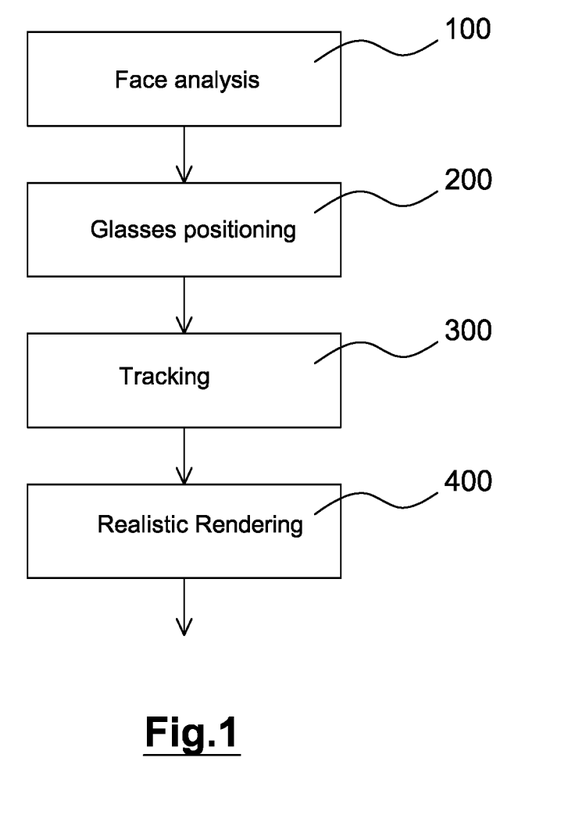
FIG. 1: a block diagram of the method.

The inventors propose a unified process that works on a single picture, bundle of pictures, video clips and real-time camera streams. The process is divided in several steps (see FIG. 1):

100—Face analysis
200—Glasses positioning
300—Tracking (for live technology)
400—Realistic rendering The usual context and scenario is the following: the user stands in front of a camera (be it a webcam connected to a PC or the one included in most mobile devices). For single picture try-on (photo mode try-on), the system either allows the user to shoot a picture with the camera or prompts him to provide a picture file from the system's internal storage. For real-time try-on (live mode try-on), the camera video stream is shown and the user can see himself on the screen in a mirror-like fashion. The user can try frames by selecting them in the interface and the frames appear on his face depending on the different interactions with the application.

Step 100: Face Analysis

The face analysis process estimates the most likely face position, orientation and morphology based on the user's picture. In the photo mode, the analysis is done on the provided picture. For the live or video modes, the analysis can be done on any picture of the stream. The face analysis is divided into three main sequential blocks:

110—Face detection (2D)
120—Face-specific features alignment (2D)
130—3D face morphology and pose estimation The results from each block can be used on their own, but usually they provide a rough estimate for the parameters estimated in the following one.

Blocks 110 and 120—2D Face and Features Detection

Blocks 110 and 120 have many possible implementations, and the way they are linked together depends on the specific techniques employed. We separate them in order to allow a fast and reliable client-server implementation on systems with limited computational capabilities (e.g. on web clients and mobile devices).

In pictures or live mode, we allow the user not to face the camera strictly straight; a 30° angle is tolerated on each 3D direction angle. Wider angles can be achieved depending on the quality of the face detection stage.

First, face detection is performed thanks to a face detector such as the Viola-Jones supervised classifier. The selection of the particular detector depends on its availability and suitability on the different platforms (web clients, mobile devices, etc.) and contexts (kiosk systems, server-hosted service, etc.). Then a feature alignment algorithm is used to find specific face features. We use the features detector provided by Luxand (https://www.luxand.com/) which finds internal face features very reliably. We then apply the HPAAM features alignment algorithm that precisely locates the projection of meaningful 3D features on the image ([Method for detecting a predefined set of characteristic points of a face, EP2678804 A1, Choukroun and Le Gallou, 2014]). Unlike existing techniques that are prone to localization error in cluttered environments, HPAAM is particularly stable on features located on the outline of the face, such as ear points. Since HPAAM is a technique that relies on a learning phase, the use of predetermined points with a 3D correspondence has an impact on the success of our global face analysis technique in terms of robustness and efficiency. Usually, this relationship is specified for a few points in 3D face analysis techniques, such as the starting points of a 3DMM fitting strategy, where 5 points are defined manually (see Romdhani's PhD thesis: [Face Image Analysis using a Multiple Features Fitting Strategy, Romdhani PhD thesis, 2005]).

Block 130—3D Face Pose and Morphology Estimation

We then estimate the 3D face parameters by using a statistical geometric model of the human face morphology. We license the patented Basel Face database, described in [Face Recognition Based on Fitting a 3D Morphable Model, Blantz and Vetter, 2003]. However, the algorithm presented in this publication is not suitable for real-time face-alignment, so we propose an alternative method to efficiently estimate the position, orientation and morphology of the face, as well as internal camera parameters. We use the features found in the features detection stage and dynamically fit contours in the image. A similar approach can be found in Romdhani's PhD thesis [Face Image Analysis using a Multiple Features Fitting Strategy, Romdhani PhD thesis, 2005], or R. Knothe's PhD thesis [A Global-to-Local Model for the Representation of Human Faces, Knothe PhD thesis, 2009].

The goal is to estimate the camera parameters (extrinsic and/or intrinsic) $\theta_{cam}$ and the face model parameters $\theta_{model}$. We minimize the distance between the found face features in the image $f_{i,j=1\ldots n}$ and the projection of the 3D semantic points defined on the parametric face $Proj(X_{s(i)})$, as well as the distance between the projection of the parametric face contours (i.e. the projection of the face model points whose normal is orthogonal to their viewing direction) and associated image edges. This can be implemented in several manners. Knothe or Romdhani use distance maps on a standard edge detector output.

The main problem is that these edge detectors use a standard magnitude normalization that it is not adapted to face image variability: distance to camera, focus, parts of the face, . . . can affect the scale magnitude of the edges and lead to miss detection and poor localization of contours.

To overcome this problem we sample the orthogonal direction to the contours of the current sample point to sample the contours for several reasons: numerical efficiency, stability and compatibility with other alignment techniques used in 3D object tracking. To do that, for each iteration of the minimization, we compute $C(\theta_{cam},\theta_{model})$ containing a subset of the face model points $X_j$ with normal $n_j$ orthogonal with the axis projection and associated image contour points $cont_j=ProjContour(X_j,n_j)$. ProjContour is a function projecting the point $X_j$ and searching along the normal projection the best contour among multiple hypotheses.

These hypotheses are computed locally since the edges are computed along the normal direction and respect the magnitude of the signal, which gives a precise and scale invariant edge detection for the whole face object. Our cost function can be implemented using an M-estimator approach such as one using the Tukey robust weight function as in [Combining Edge and Texture Information for Real-Time Accurate 3D Camera Tracking, Vacchetti et al., 2004]. Alternatively, we can compute the residual for the closest point along the normal direction of the contour among multiple hypotheses. We solve:

$$\min_{\theta_{cam},\theta_{model}} \left( \gamma \sum_{i=1 \ldots n} \|f_i, Proj(X_{s(i)})\|_2 + (1-\gamma) \sum_{X_j \in C(\theta_{cam},\theta_{model})} \|Proj(X_j), cont_j\|_2 \right)$$

where $\|.,.\|_2$ denotes the Euclidean distance and $\gamma$ is a parameter allowing to give more importance to one of the 2 parts of the cost function: the contours or the features. This equation can be solved using standard gradient descent techniques (Levenberg-Marquardt).

Our technique's main advantage is that when multiple images are available (as in video mode or shooting multiple pictures, optionally from different cameras), it extends to a multi-image analysis algorithm that relaxes the 2D/3D semantic correspondence constraint and allows to refine all the estimated parameters. It can be used to search the best-fit morphology for all the images and pose parameters of each camera. If desired, we can add a feature matching algorithm between close enough images, as seen in [Accurate Face Models from Uncalibrated and Ill-Lit Video Sequences, Dimitrilevic et al., 2004]. But their method is far from real-time, and requires close pictures and a dense and robust optical flow field, which is hard to obtain on standard webcam images. With our pre-defined 3D semantic points, contours and the control of the number of detected points, we can achieve real-time efficiency on this multi-views problem.

The cost function described above can be used for combined real-time 3D face tracking and estimation, for a set of key images during a real-time tracking stage, or using multiple pictures given by the user through the interface. We then solve:

$$\min_{\theta_{cam},\theta_{model}} \left( \sum_{k=1}^{nbl} \left( \gamma \sum_{i=1 \ldots n} \|f_{k,i}, Proj(X_{s(i)})\|_2 + (1-\gamma) \sum_{X_j \in C(\theta_{cam},\theta_{model})} \|Proj(X_j), cont_{k,j}\|_2 \right) \right)$$

$\theta_{cam}$ now contains intrinsic camera parameters and extrinsic camera parameters corresponding to each of the nbl images. We explain in the tracking section how we get the key images to solve these equations.

Block 140—3D Expressions

Expressions add variability to the face model and factoring them out enables a more stable and accurate estimation of the face pose and morphology parameters, which in turn improves the stability and accuracy of the try-on.

A usual approach for creating parametric variations of a mesh is to use blend shapes, a set of geometric models linearly combined to produce unique instances. A common technique to compute these blend shapes is to derive then statistically as in [A 3D Face Model for Pose and Illumination Invariant Face Recognition, Paysan et al., 2009]. The model takes the following form:

$g(\alpha)=g_m+\alpha \times V$ where $g(\alpha)$ is a vector representing a new shape. $g(\alpha)=(x_1,y_1,z_1, \ldots, x_n,y_n,z_n)^T$, with $(x_i,y_i,z_i)$ is the $i^{th}$ vertex, $g_m$ is the mean 3D shape, $\alpha$ is a vector that contains specific user adaptation parameters and V is a matrix that contains the Statistical Shape basis. Generally, Statistical Shape basis do not include expression variations, they only include identity variations which ensure a good separability of control parameters.

We add expressions to the model in an efficient way for real-time computation.

Our 3D model is a wireframe model which could be reshaped according to $g(\alpha,\beta)=gm+\alpha V+\beta A$ where $\beta$ is a vector that contains the animation parameters, and A is a matrix that contains the Animation Units. As in [CANDIDE-3—An Updated Parameterised Face, Ahlberg, technical report, 2001], the Animation Units matrix allows the 3D tracked points to explain expression variations.

Not only this parameter split is more powerful than the classic modeling, it also simplifies real-time computation: instead of letting all of the 3D pose, face identity and expression parameters change each frame during the tracking process, we can fix the non-varying identity parameters (which could be fed from the face analysis stage) and estimate only the 3D pose parameters and a few expression variation parameters.

In the tracking process, the full estimation of the deformable shape model parameters and pose is based on the resolution of:

$$\min_{R,T,\beta} proj(K \times (R \times g(\alpha, \beta) + T)) - p2D$$

where R is the 3D rotation matrix, T is the 3D translation, K is the intrinsic camera parameters matrix, $\alpha$ is fixed in face analysis stage, p2D is the current position of 3D tracked point in the image and proj is the function:

$$\begin{pmatrix} \vec{x} \\ y \\ z \end{pmatrix} \rightarrow \begin{pmatrix} x/z \\ y/z \end{pmatrix}$$

Step 200: Glasses Positioning

In order to finely position the glasses taking the morphology of the user and the physical characteristics of glasses into account, we define the glasses model as a segmented 3D object comprised of at least the following parts: the front-frame corresponding to the front of the glasses, two arms, two lenses and possibly nose pads when available. Because we want the glasses to fit perfectly on the face, we need to have a good parameterization of the glasses that guarantees a maximum likelihood interpretation of the glasses main deformations: arms opening and whole object deformation when put on a face.

Glasses Parametrization

We now describe how we obtain a segmented glasses object from a 3D model that has an accurate parametrization for physical realistic positioning. We consider that the arms, even if not identified at this stage, are opened (approximate angle of 90 degrees to the frame). This parametrization is usually done during an offline step.

Figure 2:
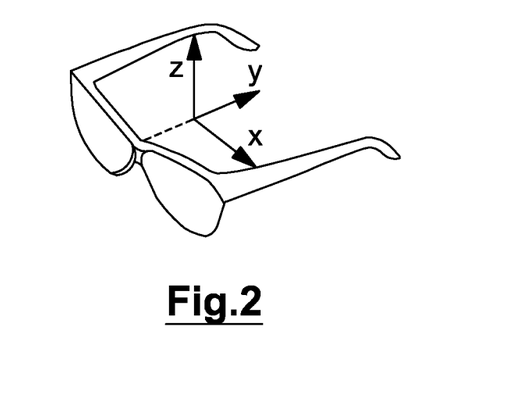
FIG. 2: an illustration of the orientation and placement of the frame.

We consider a rough reference frame for the glasses that can be obtained by registering 3D vertices of the mesh to a statistical 3D model of learned 3D glasses models, using PCA for instance, or registering the projection of the model on a picture of the frame. The frame can also be annotated by naming a left and right object such as lenses for instance. The frame is oriented and placed as shown in FIG. 2.

In this reference frame, the first step is the automatic segmentation of the glasses into the different elements and in particular we segment the two arms. Considering the glasses in zy plane, we apply cuts along y axis. For each slice, we compute the distance between the points with the z minimum and the z maximum. The plane cutting the arms from the front-frame is the cut where two consecutive distances have the maximal difference.

Once we have segmented the mesh, we need to replace the glasses model in a more accurate reference frame and fix the possible defaults of geometry if the mesh is issued from a 3D scanning process. This is necessary to ensure an accurate positioning at every local location of the glasses and the face. First, we symmetrize the glasses combining local symmetrization and a non-linear deformation field to the glasses arms. The glasses model is aligned along the x, y and z axis such that the arms are aligned along the y axis and the frame along the x axis. Then, the model is symmetrized by applying successively three rotations around the y and z axis, denoted $R_y$ and $R_z$, in order to minimize the following cost function:

$$E_s(R_x, R_y, R_z, M) = \max(E_{nS}(R_y R_z M, \Delta_{yz} R_y R_z M), E_{nS}(\Delta_{yz} R_y R_z M, R_y R_z M))$$

where M is the input mesh, $\Delta_{yz}$ is the reflection through zy plane and $E_{nS}$ is the non-symmetric distance function defined as follows:

$$E_{nS}(M_1, M_2) = \sum_{p_1 \in M_1} \min_{p_2 \in M_2} \|p_1 - p_2\|$$

For each arm, a skeleton is extracted by linking barycenters computed for several slices done along the longest direction of the arm. A deformation non-linear field is computed by exploiting this skeleton. A displacement vector $D(P_i) = \Delta_{yz}(Q_i) - P_i$ is computed for every point on the skeleton curve where $Q_i$ is the point on the skeleton curve of the other arm with the same curvilinear coordinates as $P_i$ (i.e., with the same curvilinear distance from the curve origin). For any point P on the arm surface, the displacement field DF is then:

$$DF(P) = P + \frac{y}{L} D(P_i)$$

where $P_i$ is the point of the skeleton curve with same y coordinate as P, L is the length of the arm according to the y axis.

In another embodiment, all the parameters described above can be found in a global minimization process.

Now, all the glasses processed in this way, from any source (3D manual modeling, 3D scanner), are in the same reference frame and configuration, and ready for try-on.

Physical Realistic Glasses Positioning and Deformation

The positioning is computed in real-time during the online stage, and changes with the 3D estimated morphology. We now describe several approaches that we use to position the glasses precisely on the face, depending on the application context. Correct glasses positioning is indeed key to a realistic try-on experience. We describe here three modes that we use, depending on the try-on characteristics request:

1. Glasses fit to face: scale is not respected between glasses and all frames are positioned on the face with an opening of the arms of 5 degrees to account for the widening at the face temples. In this mode, the glasses are always fit to the user's face.

2. Glasses fit to face with relative size: face size is not known, but glasses are positioned and scaled such that for the average size of the chosen face category, glasses are positioned and arms opening are computed with glasses deformation such that the relative size of the glasses is respected. The try-on is statistically very close to the absolute size.

3. Glasses fit to face with absolute size: real face size is known and glasses are positioned in the best possible way on the face, with the guaranty to always get a realistic result.

Mode 1: Point to Point Positioning without Local Physical Deformation

In an offline preprocessing step, 3D points are defined on a generic 3D average face and on every 3D frame that will be used for the try-on. Glasses are then placed using at least the following steps:

In an offline part, 3D glasses points are defined at the end of arms and on nose pads.

We first solve $\min_{R,T} \Sigma_{i=1}^{n}$ Wi×((R×GP3D(i)+T)−AP3D(i)), where R is the 3D rotation matrix of glasses, T the 3D translation, GP3D(i) the $i^{th}$ vertex of specific points defined on glasses, AP3D(i) the $i^{th}$ vertex corresponding to GP3D(i) on the generic 3D face, and Wi a weight specified by point.

We compute a scale "S" which is defined by the ratio between the two farthest points on glasses width and the corresponding points on the generic 3D face.

Then we solve $\min_{R,T} \Sigma_{i=1}^{n}$ Wi×((R×S×GP3D(i)+T)−AP3D(i))

For safety, we add 1 mm in depth and in height on 3D glasses points corresponding to nose pads. This ensures the glasses do not intersect with the 3D parametrized face.

Modes 2 and 3: Point to Surface Positioning with Local Physical Deformation

As the 3D face has an average size, we can define an average face for every morphology class partition that we want: men, women, children, ethnic morphological characteristics (African, Asian, Caucasian, etc). We can build the average glasses size and compute a default scale for every class that we store in a database. The relative size of the glasses will be respected in each category. With this technique, the absolute size of the virtual glasses is pretty close to the accurate scale during the try-on.

The algorithm solves point to surface constraints as well as soft constraints defining good positioning rules. It works as follows:

1. Offline part
  a. Parameterize the surface of the glasses,
  b. Sample m points at the back on the front-frame (possibly on the nose pads) and store it as 3D glasses metadata $g_{i,i=1...m}$,
  c. Define soft constraints between the face and the glasses that correspond to an adequate glasses wearing position, such that the pupils height is at ⅔ of the lenses height, or/and the top of the frame should meet the bottom of the eyebrows.

Figure 3:
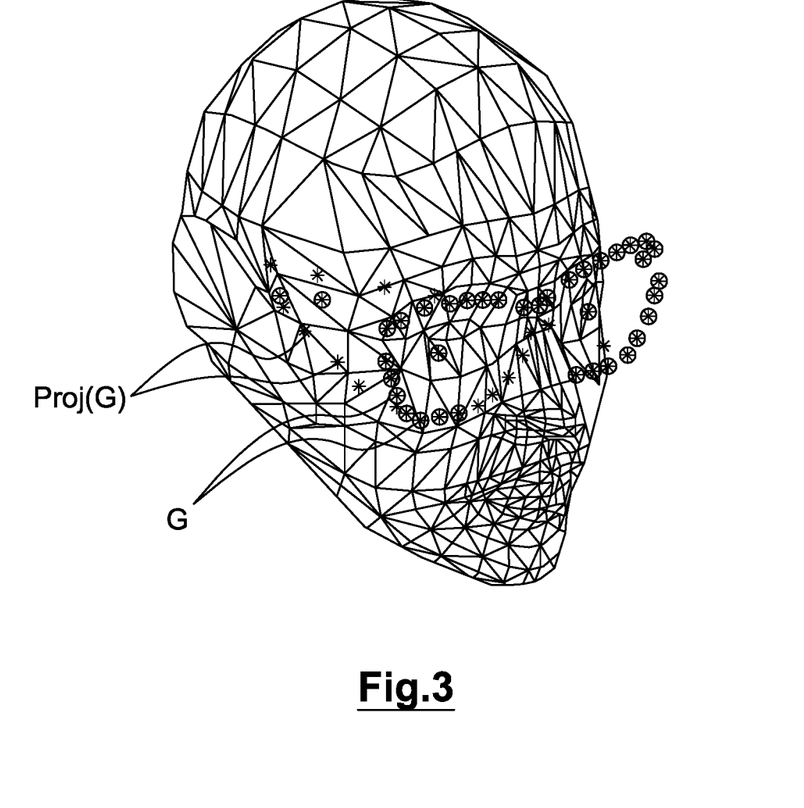
FIG. 3: a face model illustrating the points used in the method.

2. Online part:
  a. Compute the best position and parameterized deformation that minimize the distance from the defined glasses points to the face surface, respecting soft constraints, with no interpenetration. This computation is either done whenever a new user morphology is estimated or performed once offline for every class of face. It requires four steps:
    i. Compute the glasses height with the rule-of-thumbs that each eye should be at the third of the corresponding lens (z translation), and any other rule which gives a first z translation estimate;
    ii. Compute the rotation $R(\psi)$ making the arms rest on the ears (in the yz plane, we compute the angle $\psi$ between the direction of the arm and the direction from the begin of the arm to the face temple; $R(\psi)$ is defined by an euler angle corresponding to the x axis);
    iii. Compute the translation along y axis $trans_y$ such that $trans_y = \min_{i=1...m}(\|Proj_y(g_i)-g_i\|_2)$ where $Proj_y(g_{i,i=1...m})$ is the projection of $g_i$ on the face model along the y axis ($g_{i=1...m}$ are points noted as G in FIG. 3 and $Proj_y(g_{i=1...m})$ are noted as ProjG);
    iv. Compute the non-rigid deformation of the arms such that the face model temples and the associated arms points are at the same position.

This algorithm is very efficient and physical parameters can be added to deformation model of the glasses depending on their physical properties, such as material and thickness. For the iv., the non-rigid deformation function $tdeform(\varphi, \theta_{deform})$ of arms describes the deformation of the mesh subject to the angle constraint $\varphi$ on the arms. It can be a simple heuristic deformation model or a more complex one taking material type and thickness into account. One of the advantages of this method is that no minimization is required and we guarantee that the all glasses cannot interpenetrate the head. tdeform could be defined by min (1, $f(\theta_{deform})\|Pp-PC\|_2/\|Pp-Pt\|_2)R(\varphi)(Pc-Pp)+Pp$ where Pp is the 3D pivot point of a arm, Pc is the current 3D point of the arm to be modified, Pt is the face model temple point, R the 3D matrix rotation defined by an Euler angle corresponding to the z axis and $f(\theta_{deform})$ is a function depending on the material and the thickness.

For mode 3, the real size of the face is known, and the scale is usually known thanks to face measurements, such as the pupillary distance. The virtual try-on is then comparable to the try-on of real glasses, i.e. a picture of the user taken with the virtual glasses or the real glasses has no size difference.

Step 300: Real-Time 3D Face Tracking and Analysis for Try-On

After the face analysis step, we have got the 3D morphology and pose of the face. In a real-time or video context, we perform a 3D model tracking with a technique inspired from [Stable real-time 3d tracking using online and offline information, L. Vacchetti, V. Legetit, P. Fua, Pattern Analysis and Machine Intelligence, 2004]. For robustness and real time efficiency, we bring 3 improvements to this approach:

We add expression parameters to the 3D face modeling. In each frame, we solve $\min_{R,T,\beta} proj(K \times (R \times g(\alpha,\beta)+T))-p2D$.

Instead of using a single keyframe in this process, we create a keyframes array which is a set of frames with their associated tracked points and estimated parameters (3D face pose and expression parameters) saved at strategic pose parameter values when the tracking score is acceptable. This way we choose a nearest keyframe, in terms of parameters distance, as the current keyframe used in the tracking process. The chosen pose parameters are the ones that are relevant in terms of impacting the face model appearance, such as distance to the camera, and two out-o-plane angles (face right/left, and up/down).

Our interest (tracked) points are pre-defined on our 3D face model, and can be combined with detected corner features (FAST, HARRIS). We do not use a classical points matching process like the one described in Vacchetti et al., because stability and speed execution are not controlled: for face images, the detected face points have a very poor spatial distribution and their number is low and unstable that leads failures in the tracking process.

In order to reach very fast performance, we use a multi-resolution template tracking process that allows finding corresponding matches in the current images with a 2D template tracking. A fast normalized cross correlation like the one described in [Fast Normalized Cross-Correlation, J. P. Lewis, 1995] or a Lucas-Kanade optical flow technique can be used.

During the tracking process, we can choose to improve morphology parameters of the user. Indeed, with the keyframes array (or with another frames array), we can perform a minimization as described seen in the morphology estimation section and so improve the a parameter of our the user's 3D face modeling $g(\alpha,\beta)=gm+\alpha V+\beta A$. We reach real-time performance thanks to the use of our points and contours model and our keyframes collection multidimensional array. To improve performance, unlike the Vacchetti & al. method, we do not need to perform a prediction of the appearance of the tracked points with a rendering of the 3D face model or with patches homography deformation thanks to our keyframes collection.

Similar ideas of merging semantic points, corner points and silhouettes contours can be find in [Real Time Feature Based 3-D Deformable Face Tracking, Zhang et al., ECCV2008]. However, their approach has a learning stage to predict the images clues for matching, and uses a stochastic algorithm to generate solution hypothesis, which is not suitable to avoid jittering and for real-time.

Step 400: Real-Time On-Demand Try-On and Realistic Rendering

The last step consists in the visible augmented reality try-on shown to the user. In the live try-on video/camera stream case, the user looks at himself wearing glasses. The current picture is mixed with synthetic objects and effects respecting the coherence of the scene: geometry, local interactions of the virtual object with the surrounding scene, photometry.

In order to reach realistic rendering effects in real-time and a realistic final image of try-on, we propose the following original augmented-reality rendering pipeline: unlike classic shading systems that rely on a variety of shader codes to simulate different materials, our rendering framework uses a physically-based appearance model of the materials and lights to produce realistic-looking pictures of the virtual glasses. Materials are described by their macroscopic parameters such as diffuse and specular albedos, surface normals, and surface roughness. These parameters drive a micro-facets model of light diffusion and are usually defined continuously on the surface using textures. Those textures are either authored by hand or assembled automatically from our proprietary glasses reconstruction system [Model and method for producing 3d photorealistic models, US 20140055570 A1, Fitting Box, 2013].

This appearance model is generic enough to simulate realistically a wide range of real materials. Having a single shader code avoids the common problem related to the management of many shaders snippets to compile a final runtime shader.

The different glasses parts (frame, lenses, nose pads, etc. . . . ) or surface elements (texels) through texture parametrization are assigned a specific material. This assignment can be made automatic by analyzing the variation of surface appearance in different orientations and lighting conditions. Since our lighting model is compact in terms of parameters, we can solve the inverse rendering problem easily as in [Relighting Objects from Image Collections, Haber et al., 2009]. When the assignment is done per texel, the texture encodes the material parameters or material indexes. Material parameters can also be tweaked from glasses to glasses if desired.

All computations are formulated in a high level shader language for fast evaluation by dedicated graphical processing units (GPU). This guarantees that the rendered results look similar in the different platforms that we support (web clients, mobile devices and PC-based systems).

The lighting system is made of synthetic lights as well as high dynamic range (HDR) environmental maps, resulting in an HDR output. In order to display the rendered scene on a standard (low dynamic range; LDR) screen, a tone-mapping transformation is applied to this HDR output to compress the intensity range. A photographic tone-mapping operator is used to maximize contrast conservation.

During try-on, the picture or video stream should show through the translucent parts (most notably the lenses), leading to the compositing of a HDR layer (the glasses rendering) with an LDR layer (the "real" images). Standard methods based on alpha-blending will generally fail to produce realistic results because the pixel intensity values for the background and augmentation layers do not represent coherent light radiances. We account for the masking of the underlying layer by highlights on the rendered scene in a realistic way by applying an opacity correction formula before tone-mapping and compositing, as explained below.

The formula is evaluated at each fragment. Let $\alpha$ be the opacity and $L_{HDR}$ the computed irradiance value at the current fragment. We compute a corrected opacity $\alpha_{LDR}$ as a barycentric combination between $\alpha$ and 1.

$$\alpha_{LDR} = \frac{L_{HDR}}{L_{HDR}^{Max}} + \left(1 - \frac{L_{HDR}}{L_{HDR}^{Max}}\right)\alpha = \alpha + (1-\alpha)\frac{L_{HDR}}{L_{HDR}^{Max}}$$

We see that the combination coefficient is the ratio $$\frac{L_{HDR}}{L_{HDR}^{Max}},$$

where $L_{HDR}^{Max}$ is an estimation of the maximum irradiance observable in the real scene at the current fragment position. $L_{HDR}^{Max}$ can, for example, be evaluated based on the characteristics of the acquisition device.

Another component of our rendering system enabling the seamless integration of the glasses in the real scene is the computation of realistic looking shadows. In our scenario the glasses should cast shadows on the user's face. We achieve realism by first computing an accurate estimation of the user's face morphology (as detailed in the previous sections) and second by estimating the principal direction of the light in the real scene. We integrate the face model into the synthetic scene as a special object which is not directly visible, but act both as an occluder for the glasses parts which are hidden by the face and as a shadow receiver.

The latter aspect can be done by assuming a parametric reflection model for the skin (e.g., Lambertian) and finding its best fit to the face surface normals and pixel intensities, as usually done in stereophotometry methods [Basri, R. et al., Photometric Stereo with General, Unknown Lighting. IJCV 2007]. Here the geometry and camera parameters are known from previous step and only the lighting environment needs to be evaluated. The model can also include an estimation of the light source area, a parameter that can then be used to render realistic soft shadows (shadows with penumbra).

To render soft shadow in real-time we use the Variance Soft Shadow Mapping algorithm [Variance Soft Shadow Mapping, Yang et al., Pacific Graphics 2010]), but other techniques are also suitable, such as the Percentage Closer Soft Shadows [Percentage-closer soft shadows, Fernando, SIGGRAPH 2005 Sketches].

Step 500: No Failure and Seamless Augmented Reality Try-On Experience

To improve robustness, we introduce a tracking recovery mode that allows a try-on experience without visible failure in try-on. The method is valid for any augmented reality object and very efficient in our case.

We introduce a 3D tracking quality score based on 2D matching score and/or the discrepancy between the current head pose parameters and a head movement model prediction. As an example, a Kalman filter with position, speed and acceleration parameters can be used.

Then, when the tracking score is getting low, the system switches from the described tracking algorithm to a recovery state.

The recovery state works as follow:

The system determines the keyframe to use, called recovery keyframe: the nearest keyframe given by head movement estimation or the frontal keyframe if the head movement estimation confidence is not good enough.

Recovery keyframe patches are then searched and matched at the estimated face position given by the face detector or the head movement model. 3D head pose parameters are then estimated using only this recovery keyframe. Face detection can be performed using keyframe as a template and searching it in whole image in a very low resolution.

This process is very fast but could take some time. In a classical augmented reality pipeline in which the rendering is done at the end of the scene analysis part, this would result in lowering the rendering framerate or making the virtual object disappears. To overcome this issue, we decorrelate the frame grabbing process, the analysis process and a rendering pipeline in distinct computation threads. Thus, during the recovery computation, we use our movement prediction model to render the scene even if the scene analysis result is not available. When scene analysis results are available, we use our Kalman filter to smoothly merge the prediction and the computation.

The main advantage of this technique is that the user doesn't notice any failure or non-smoothness during the try-on experience.

The invention claimed is:

1. A method for generating a real-time realistic-looking image of a pair of virtual glasses defined as a 3D object comprising two arms, and positioned on a real user face image issued from an image, which is one of a single image, a bundle of pictures, a video clip or real-time camera streams, comprising the steps of:
    estimating facial parameters comprising a 3D rotation matrix, a 3D translation vector and morphology parameters, of a user's face by a face analysis element;
    estimating glasses positioning parameters comprising a 3D rotation matrix, a 3D translation vector, global and local deformation parameters of the virtual glasses, and arms articulation, adapted to the morphology parameters, by glasses positioning element associated with a try-on mode for look or real-size simulation;
    mixing the real user face image with the virtual glasses positioned in accordance with the glasses positioning parameters by a realistic rendering element;
    applying an opacity correction formula to translucent parts of the glasses; and
    wherein global and local deformation parameters of the virtual glasses comprise non-rigid deformation of arms of the virtual glasses.

2. The method according to claim 1, wherein the facial parameters further comprise expression parameters; and further comprises the step of estimating the expression parameters of the user's face by the face analysis element.

3. The method according to claim 1, further comprising the step of estimating intrinsic camera parameters by the face analysis element.

4. The method according to claim 1, further comprising the step of providing parameterization, segmentation into parts, and mesh correction by a glasses 3D model analysis element of the glasses positioning element.

5. The method according to claim 1, wherein the step of estimating the glasses positioning parameters are performed by two glasses positioning elements.

6. The method according to claim 1, further comprising the step of providing a position, a rotation, and a face parameters refinement from multiple images in real-time by a 3D face tracking element.

7. The method according to claim 1, further comprising the step of estimating opacity correction and tone mapping parameters by a realistic rendering element.

8. The method according to claim 1, further comprising the steps of:
    performing an image acquisition decorrelation, a scene analysis, and rendering in parallel;
    recovering a 3D face pose; and
    providing, at each frame, a smooth 3D pose to the realistic rendering element by a head movement and control filter.

9. The method according to claim 2, further comprising the step of estimating the facial parameters of the user's face using a user face model, image contours, and 3D semantic points in correspondence with detected features from the image by the face analysis element.

10. The method according to claim 9, further comprising the step of estimating the facial parameters of the user's face using the user face model, the image contours and the 3D semantic points in correspondence with the detected features from more than one image by the face analysis element.

11. The method according to claim 1, further comprising the steps of:
    offline processing to generate a symmetrized and segmented object of the virtual glasses, comprising arms and a frame, from a 3D model, and to reposition the object in a reference system;
    online real-time processing to estimate the glasses positioning parameters without interpenetration, comprising the 3D rotation matrix, the 3D translation vector, an arm opening angle, and the global and local deformation parameters, by mixing mechanical constraints and constraints linked to properties of the object.

12. The method according to claim 11, wherein the offline processing step further comprising the steps of:
    automatic segmentation of the object;
    extracting an object skeleton by slicing the object and linking barycenters;
    computing a reference frame and a non-linear deformation field that maximizes a global symmetry in accordance with a symmetrization of the object skeleton; and
    computing a displacement of object vertices in accordance with an influence function of a displacement field of the object skeleton.

13. The method according to claim 11, wherein the online processing step comprises the step of fitting the virtual glasses to the user's face where a scale between the virtual glasses and the user's face is ignored, and the frame is positioned on the user's face with an arms opening of 5 degrees to account for a widening at temples of the user's face.

14. The method according to claim 11, wherein the online processing step comprises the step of fitting the virtual glasses to the user's face with a relative size where a face size of the user's face is not known, the virtual glasses are positioned and scaled for an average face size of a predetermined face category, and an arms opening is computed in accordance with the global and local deformation parameters of the virtual glasses utilizing the relative size.

15. The method according to claim 11, wherein the online processing step comprises the step of fitting the virtual glasses to the user's face with an absolute size where a face size of the user's face is known.

16. The method according to claim 1, further comprising the step of modifying an opacity value $\alpha$ into a corrected value $\alpha_{LDR}$ of objects using the formula:

$$\alpha_{LDR} = \frac{L_{HDR}}{L_{HDR}^{Max}} + \left(1 - \frac{L_{HDR}}{L_{HDR}^{Max}}\right)\alpha = \alpha + (1-\alpha)\frac{L_{HDR}}{L_{HDR}^{Max}}$$

where $L_{HDR}$ is the computed irradiance and $L_{HDR}^{Max}$ is an upper bound on a real scene irradiance.

17. A method for generating a real-time realistic-looking image of a pair of virtual glasses defined as a 3D object comprising two arms, and positioned on a real user face image issued from an image, which is one of a single image, a bundle of pictures, a video clip or real-time camera streams, comprising the steps of:

estimating facial parameters comprising a 3D rotation matrix, a 3D translation vector and morphology parameters, of a user's face by a face analysis element;

estimating glasses positioning parameters comprising a 3D rotation matrix, a 3D translation vector, global and local deformation parameters of the virtual glasses, and arms articulation, adapted to the morphology parameters, by glasses positioning element associated with a try-on mode for look or real-size simulation;

mixing the real user face image with the virtual glasses positioned in accordance with the glasses positioning parameters by a realistic rendering element;

modifying an opacity value α into a corrected value $\alpha_{LDR}$ of objects using the formula:

$$\alpha_{LDR} = \frac{L_{HDR}}{L_{HDR}^{Max}} + \left(1 - \frac{L_{HDR}}{L_{HDR}^{Max}}\right)\alpha = \alpha + (1-\alpha)\frac{L_{HDR}}{L_{HDR}^{Max}}$$

where $L_{HDR}$ is the computed irradiance and $L_{HDR}^{Max}$ is an upper bound on a real scene irradiance; and wherein global and local deformation parameters of the virtual glasses comprise non-rigid deformation of arms of the virtual glasses.

18. The method according to claim 17, wherein the facial parameters further comprise expression parameters; and further comprises the step of estimating the expression parameters of the user's face by the face analysis element.

19. The method according to claim 17, further comprising the step of estimating intrinsic camera parameters by the face analysis element.

20. The method according to claim 17, further comprising the step of providing parameterization, segmentation into parts, and mesh correction by a glasses 3D model analysis element of the glasses positioning element.

21. The method according to claim 17, wherein the step of estimating the glasses positioning parameters are performed by two glasses positioning elements.

22. The method according to claim 17, further comprising the step of providing a position, a rotation, and a face parameters refinement from multiple images in real-time by a 3D face tracking element.

23. The method according to claim 17, further comprising the step of estimating opacity correction and tone mapping parameters by a realistic rendering element.

24. The method according to claim 17, further comprising the steps of:
performing an image acquisition decorrelation, a scene analysis, and rendering in parallel;
recovering a 3D face pose; and
providing, at each frame, a smooth 3D pose to the realistic rendering element by a head movement and control filter.

25. The method according to claim 18, further comprising the step of estimating the facial parameters of the user's face using a user face model, image contours, and 3D semantic points in correspondence with detected features from the image by the face analysis element.

26. The method according to claim 25, further comprising the step of estimating the facial parameters of the user's face using the user face model, the image contours and the 3D semantic points in correspondence with the detected features from more than one image by the face analysis element.

27. The method according to claim 17, further comprising the steps of:
offline processing to generate a symmetrized and segmented object of the virtual glasses, comprising arms and a frame, from a 3D model, and to reposition the object in a reference system;
online real-time processing to estimate the glasses positioning parameters without interpenetration, comprising the 3D rotation matrix, the 3D translation vector, an arm opening angle, and the global and local deformation parameters, by mixing mechanical constraints and constraints linked to properties of the object.

28. The method according to claim 27, wherein the offline processing step further comprising the steps of:
automatic segmentation of the object;
extracting an object skeleton by slicing the object and linking barycenters;
computing a reference frame and a non-linear deformation field that maximizes a global symmetry in accordance with a symmetrization of the object skeleton; and
computing a displacement of object vertices in accordance with an influence function of a displacement field of the object skeleton.

29. The method according to claim 27, wherein the online processing step comprises the step of fitting the virtual glasses to the user's face where a scale between the virtual glasses and the user's face is ignored, and the frame is positioned on the user's face with an arms opening of 5 degrees to account for a widening at temples of the user's face.

30. The method according to claim 27, wherein the online processing step comprises the step of fitting the virtual glasses to the user's face with a relative size where a face size of the user's face is not known, the virtual glasses are positioned and scaled for an average face size of a predetermined face category, and an arms opening is computed in accordance with the global and local deformation parameters of the virtual glasses utilizing the relative size.

31. The method according to claim 27, wherein the online processing step comprises the step of fitting the virtual glasses to the user's face with an absolute size where a face size of the user's face is known.

32. The method according to claim 17, further comprising the step of applying an opacity correction formula to the translucent parts of the glasses.

* * * * *